US008170881B2

(12) United States Patent
Creamer et al.

(10) Patent No.: US 8,170,881 B2
(45) Date of Patent: *May 1, 2012

(54) DISTRIBUTED VOICE BROWSER

(75) Inventors: Thomas E. Creamer, Boca Raton, FL (US); Victor S. Moore, Lake City, FL (US); Glen R. Walters, Hollywood, FL (US); Scott Lee Winters, Austin, TX (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/190,538

(22) Filed: Jul. 26, 2011

(65) Prior Publication Data

US 2011/0282672 A1    Nov. 17, 2011

Related U.S. Application Data

(63) Continuation of application No. 10/172,279, filed on Jun. 14, 2002, now Pat. No. 8,000,970.

(51) Int. Cl.
*G10L 21/00* (2006.01)
(52) U.S. Cl. ............... 704/270.1; 704/246; 704/247; 704/251; 704/252; 704/270
(58) Field of Classification Search .......... 704/201, 704/231, 246, 247, 251, 252, 270, 270.1
See application file for complete search history.

(56) References Cited

U.S. PATENT DOCUMENTS

| 5,541,986 | A | 7/1996 | Hou |
| 5,721,729 | A | 2/1998 | Klingman |
| 5,724,406 | A | 3/1998 | Juster |
| 5,774,808 | A | 6/1998 | Sarkioja et al. |
| 5,970,132 | A | 10/1999 | Brady |
| 6,002,673 | A | 12/1999 | Kahn et al. |
| 6,088,749 | A | 7/2000 | Hebert et al. |
| 6,091,808 | A | 7/2000 | Wood et al. |
| 6,091,954 | A | 7/2000 | Haartsen et al. |
| 6,134,313 | A | 10/2000 | Dorfman et al. |
| 6,175,619 | B1 | 1/2001 | DeSimone |
| 6,260,067 | B1 | 7/2001 | Barnhouse et al. |
| 6,272,538 | B1 | 8/2001 | Holden et al. |
| 6,625,134 | B1 | 9/2003 | Ji et al. |
| 6,707,889 | B1 | 3/2004 | Saylor et al. |
| 6,785,707 | B2 | 8/2004 | Teeple |
| 6,891,932 | B2 | 5/2005 | Bhargava et al. |
| 6,922,411 | B1 | 7/2005 | Taylor |
| 7,336,956 | B2 | 2/2008 | Halonen et al. |
| 2002/0006124 | A1 | 1/2002 | Jimenez et al. |
| 2002/0087325 | A1 | 7/2002 | Lee et al. |

*Primary Examiner* — Leonard Saint Cyr
(74) *Attorney, Agent, or Firm* — Wolf, Greenfield & Sacks, P.C.

(57) ABSTRACT

The present invention can include a method of call processing using a distributed voice browser including allocating a plurality of service processors configured to interpret parsed voice markup language data and allocating a plurality of voice markup language parsers configured to retrieve and parse voice markup language data representing a telephony service. The plurality of service processors and the plurality of markup language parsers can be registered with one or more session managers. Accordingly, components of received telephony service requests can be distributed to the voice markup language parsers and the parsed voice markup language data can be distributed to the service processors.

17 Claims, 2 Drawing Sheets

DISTRIBUTED VOICE BROWSER

CROSS REFERENCE TO RELATED APPLICATION

This application is a continuation of pending application Ser. No. 10/172,279, filed Jun. 14, 2002, which is hereby incorporated by reference in its entirety.

TECHNICAL FIELD

The invention relates to the field of telephony, and more particularly, to the use of voice browsers for telephony services.

DESCRIPTION OF THE RELATED ART

A voice browser typically operates in conjunction with a speech recognition engine and speech synthesis engine and permits a user to interact with network-based electronic content audibly. That is, the user can provide voice commands to navigate from network-based electronic document to document. Likewise, network-based electronic content can be presented to the user audibly, typically in the form of synthesized speech. Thus, voice browsers can provide voice access and interactive voice response to network-based electronic content and applications, for instance by telephone, personal digital assistant, or desktop computer.

Voice browsers can be configured to interact with network-based electronic content encoded in Voice Extensible Markup Language (VXML). VXML is a markup language for distributed voice applications and is designed for creating audio dialogs that feature synthesized speech, digitized audio, recognition of spoken and Dual Tone Multifrequency ("DTMF") key input, recording of spoken input, telephony, and mixed-initiative conversations.

Due to the extensive functionality provided by voice browsers, telecommunications product and service providers have begun utilizing voice browser technology to provide telephony services and/or features. For example, voice browsers can be used in the context of interactive voice response systems. Presently, however, voice browsers suffer from several performance related deficiencies. In particular, voice browsers typically are implemented as a single application operating on a single computing machine. Such conventional voice browser implementations are unable to process high volumes of calls or support the number of speech sessions necessary in a high volume call processing environment. In addition, once implemented, a conventional voice browser cannot be scaled according to the demand. In consequence, as demand increases, the performance of a conventional voice browser begins to decline.

SUMMARY OF THE INVENTION

The invention disclosed herein provides a solution for increasing the scalability and performance of voice browsers. In particular, rather than implementing a voice browser as a single application which must execute on a single computing machine, the present invention partitions the voice browser into several components. Each of the components can be distributed to execute on separate computing machines. For example, the voice browser can be partitioned into separate components for handling parsing, session management, and service fulfillment. The various components of the voice browser can be replicated as needed to support increased network loads. In consequence, the present invention can support an increased volume of calls and voice sessions. Moreover, as the need for voice processing increases, the present invention can be scaled accordingly to process the increased traffic.

One aspect of the present invention can include a method of call processing with a distributed voice browser. The method can include allocating a plurality of service processors configured to interpret parsed voice markup language data and allocating a plurality of voice markup language parsers configured to retrieve and parse voice markup language data representing a telephony service. The plurality of service processors and the plurality of markup language parsers can be registered with one or more session managers. Accordingly, components of received telephony service requests can be distributed to the voice markup language parsers and parsed voice markup language data resulting from the voice markup language parsers can be distributed to the service processors via the session managers.

For example, a telephony service request can be received in a session manager. The telephony service request can be associated with a particular one of the service processors and specify a location of the voice markup language data representing the telephony service. The session manager can determine an available voice markup language parser and provide the specified location to the available voice markup language parser.

The voice markup language parser can retrieve the voice markup language data from the specified location and parse the voice markup language data thereby converting the voice markup language data to an intermediate format which can be used or interpreted by the service processors. The parsed voice markup language data can be provided to the session manager, which in turn can provide the parsed voice markup language data to the associated service processor. The service processor can execute the parsed voice markup language data to implement the telephony service. Notably, additional ones of the service processors, the voice markup language parsers, and the session managers can be replicated as needed to accommodate increased call volume.

The method further can include instantiating the plurality of service processors within one or more virtual machines and the plurality of voice markup language parsers within one or more virtual machines which are separate from the virtual machines for the plurality of service processors. Additionally, the method can include locating the plurality of service processors within at least a first computing machine, the plurality of voice markup language parsers within at least a second computing machine, and the session manager within at least a third computing machine. The first, second, and third computing machines can be communicatively linked through a network.

Another aspect of the present invention can include a distributed voice browser system. The system can include a parsing component configured to parse voice markup language representations of telephony services and a telephony service fulfillment component configured to provide an execution environment to interpret the parsed voice markup language representations of the telephony services. A session management component also can be included. The session management component can be configured to coordinate the operation of the parsing and telephony service fulfillment components.

The parsing component can include one or more voice markup language parsers and the telephony service fulfillment component can include one or more service processors. The session management component can include one or more session managers. The voice markup language parsers as well as the service processors can be configured to execute within a virtual machine, such as a Java virtual machine. Notably, the virtual machine for the voice markup language processors can be independent from the virtual machine for the service processors. Additionally, each voice markup language parser and each service processor can execute within an independent virtual machine. The parsing component, the session management component, and the telephony service component can execute within separate distributed computing machines.

BRIEF DESCRIPTION OF THE DRAWINGS

There are shown in the drawings embodiments which are presently preferred, it being understood, however, that the invention is not limited to the precise arrangements and instrumentalities shown.

DETAILED DESCRIPTION

The invention disclosed herein provides a solution for increasing the scalability and performance of voice browsers. In particular, the present invention can partition a voice browser into several components, thereby forming a distributed voice browser. The various components of the distributed voice browser can execute on separate computing machines.

Notably, the various components of the voice browser can be replicated as needed, and therefore, can be scaled to process increased call volumes.

Figure 1:
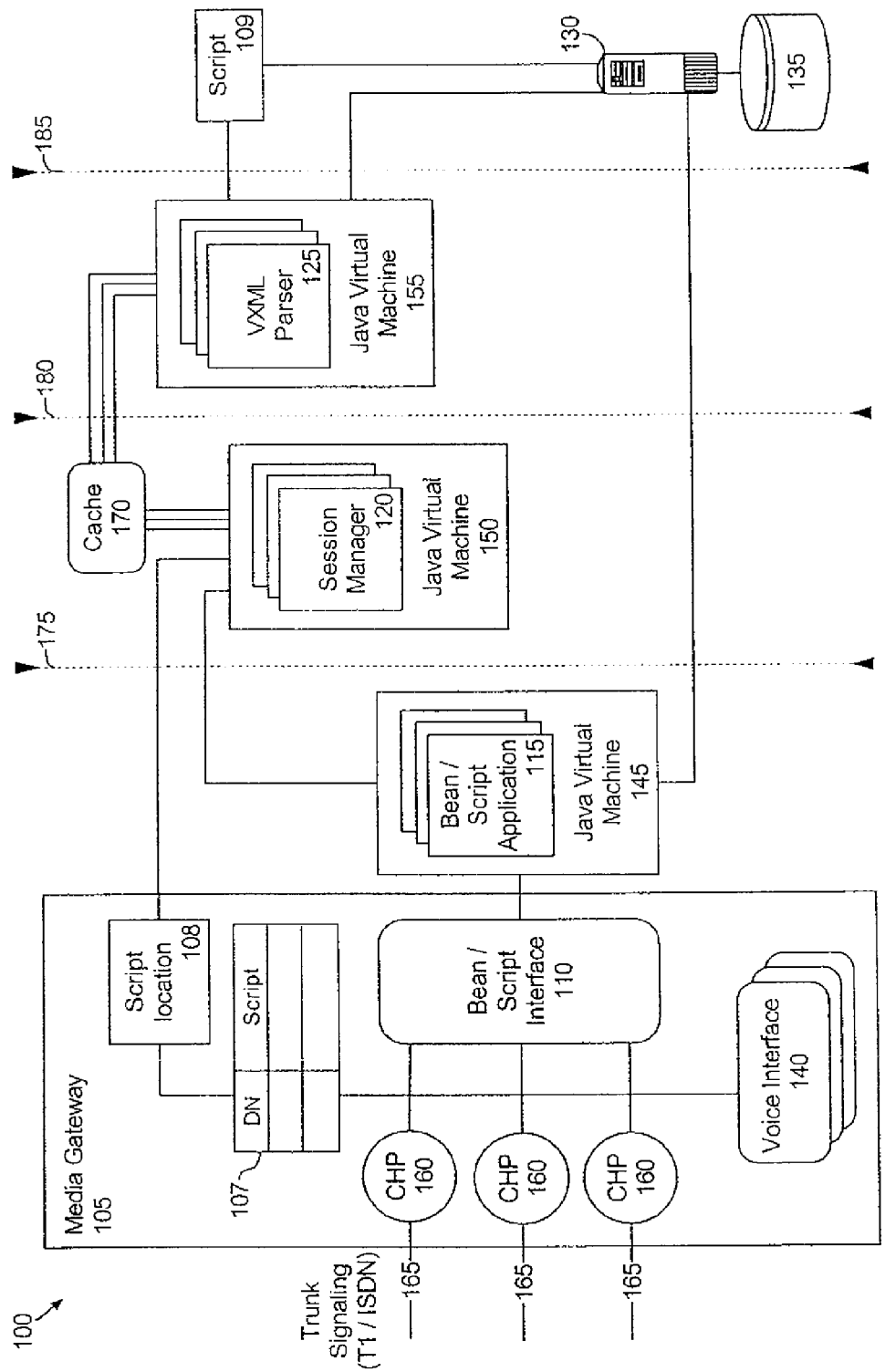
FIG. 1 is a schematic diagram illustrating a distributed voice browser in accordance with the inventive arrangements disclosed herein.

FIG. 1 is a schematic diagram illustrating an exemplary system 100 for implementing a telephony service and/or feature (hereinafter "service") in accordance with the inventive arrangements disclosed herein. As shown in FIG. 1, the system 100 can include a media gateway 105, bean/script applications (service processors) 115, session managers 120, Voice Extensible Markup Language (VXML) parsers 125, a hyper-text transfer protocol (HTTP) server 130, and a data store 135. The data store 135 can include one or more VXML scripts specifying documents, audio, text, and the like. The VXML scripts, for example script 109, are script implementations of telephony services. The VXML scripts within the data store 135 can be accessed via the HTTP server 130. It should be appreciated that although the data store 135 is depicted as a single data store, it can be implemented as one or more distributed data stores.

The media gateway 105 can be communicatively linked to one or more telecommunication trunk lines 165 such as T1 lines and/or ISDN lines. Each incoming telecommunication trunk line 165 can be interfaced with a channel processor 160 serving as an interface between the media gateway 105 and the telecommunications trunk line 165. One channel processor 160 can be included for each voice circuit of a corresponding telephony switch. The media gateway 105 also can include an application table 107 and a bean/script interface 110. The application table 107 can specify associations between dialed number inbound services (DNIS), hereinafter referred to as directory numbers, and the VXML script implementations of telephony services stored in data store 135. More specifically, the application table 107 maintains a listing of directory numbers and telephony services for which the directory numbers have been registered. The application table 107 further specifies network locations from which the various VXML script implementations of the telephony services can be retrieved.

Accordingly, upon receiving an incoming call, the media gateway 105 can determine the directory number specified by the incoming call. The directory number can be matched to one or more VXML scripts using the application table 107. Thus, the locations or addresses of the VXML script implementations of the telephony services for which the directory number has been registered can be identified. The locations of the VXML scripts of the telephony services can be provided to the session managers 120.

The bean/script interface 110, which can include bridge services or functions for connecting one local area network (LAN) to another LAN, can be included in the media gateway 105. The bean/script interface 110 can facilitate communications between the service processors 115 and the other components of the media gateway 105 such as the channel processors 160 and the voice interface 140. The bean/script interface 110 can be configured to support the range of functionality that can be provided through the VXML scripts as interpreted by the service processors 115 to be discussed herein. In particular, as the VXML scripts can support extended call control and transaction capabilities application part (TCAP) functions, the bean/script interface 110 also can be configured to support those call control and TCAP functions. The voice interface 140 can provide speech recognition as well as text-to-speech (TTS) functions. Accordingly, speech received via the telecommunications trunk lines 165 can be converted to text, and text data can be converted to an audio stream to be provided to one or more subscribers via the telecommunications trunks 165.

Taken together, the service processors 115, the session managers 120, and the VXML parsers 125, provide the components of a distributed voice browser. The VXML parsers 125 can be instantiated at runtime and can retrieve the VXML scripts from the data store 135 via the HTTP server 130. The VXML parsers 125 can convert the retrieved VXML scripts into an intermediate format which can be mapped to, and interpreted by, the service processors 115. Notably, the VXML scripts can be enhanced to include new tags defining TCAP transactions such as Allow Call, Block Call, Forward Call, Selective Forward Call, and Bridge Call. Accordingly, the VXML parser 125 also can be configured to identify any additional tag enhancements to the VXML scripts.

The service processors 115 can be reusable software components which can be combined with other components in the same or different computer system in a distributed computing environment. One service processor 115 can be instantiated at runtime for each channel processor 160, and thus, can be associated with that particular channel processor. The service processors 115 effectively serve as interpreters which provide the execution environment for the parsed VXML scripts to implement the telephony services specified by the VXML scripts. Accordingly, the service processors 115 match the internal functionality of the media gateway 105 with the parsed VXML script representation of the telephony service. As shown, the service processors 115 can be communicatively linked to the voice interface 140 of the media gateway 105. Thus, the service processors 115 can access TTS and speech recognition functions for implementing the telephony service as specified by the parsed VXML script. For example, text and recognized speech can be used to populate fields of a VXML script, form, and/or document.

Notably, the service processors 115 and the VXML parsers 125 can execute within Java virtual machines 145 and 155 respectively. Although FIG. 1 depicts a plurality of service processors 115 and VXML parsers 125 executing within single Java virtual machines 145 and 155, each of the service processors 115 and the VXML parsers 125 can execute within an individual Java virtual machine thereby minimizing the risk that an error occurring within one program will adversely affect another.

Each of the service processors 115 and the VXML parsers 125 can register with the session managers 120. Accordingly, the session managers 120 can track which service processors 115 and VXML parsers 125 are available for call processing. The session managers 120 further can coordinate the operation of a service processor 115/VXML parser 125 pair. The session manager 120 can pass information between service processors 115 and VXML parsers 125. In particular, requests provided to the session managers 120 from the media gateway 105 can include the called directory number, one or more universal resource identifiers (URI), including universal resource locators (URLs), specifying one or more VXML script representations of telephony services, and an identifier representing the particular channel processor upon which the call was received. The session managers 120 can save the information in a local data store. Accordingly, the session managers 120 can determine a free VXML parser 125 to which the received URI can be provided. Additionally, results from the VXML parsers 125 can be provided back to the proper service processor 115 according to the saved URI, called directory number, and channel processor identifier.

As was the case with the service processors 115 and the VXML parsers 125, a plurality of session managers 120 can execute within a single Java virtual machine, or each session manager 120 can execute within an individual Java virtual machine. In any case, as mentioned, the service processors 115, the session managers 120, and the VXML parsers 125 can exist in separate computing machines distributed throughout a computing network. Further, these various components can be replicated as needed to support increased processing loads. In consequence, the service processors 115, the session managers 120, and the VXML parsers 125, when taken together, provide a distributed voice browser architecture which can be scaled to support a large volume of system requests.

A cache memory 170 can be disposed between the session managers 120 and the VXML parsers 125. The cache memory 170 can increase system performance by reducing multiple fetching and parsing of frequently used VXML scripts. The inventive arrangements disclosed herein further can include one or more firewalls 175, 180, and 185. Although firewalls are not necessary for operation of the system 100 as disclosed herein, the addition of the firewalls provides added network security. In particular, firewalls 175 and 180 provide double firewall protection as required by many telecommunications companies. Firewall 185 can provide isolation of the VXML parsers 125 from corporate or other private networks.

Figure 2:
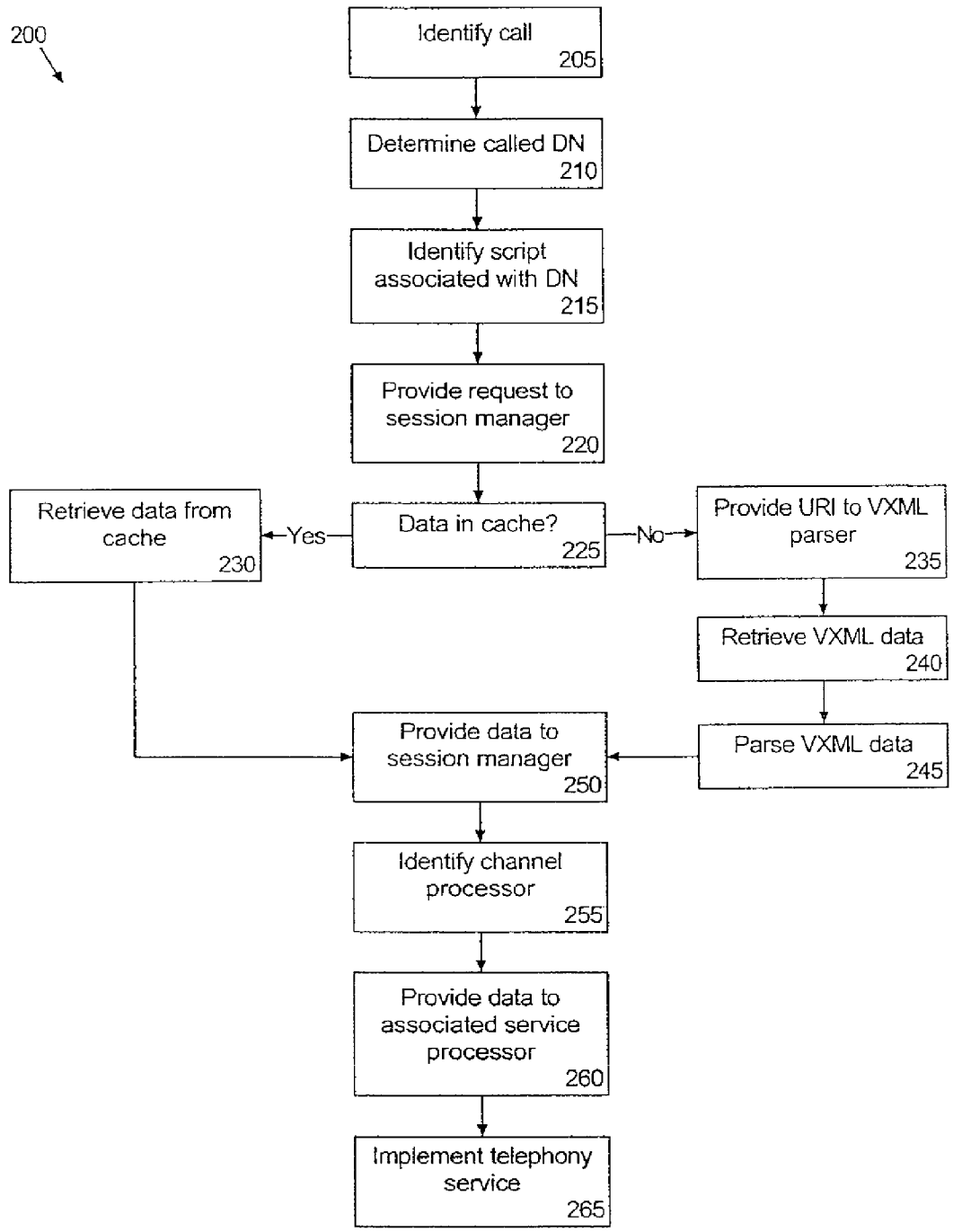
FIG. 2 is a flow chart illustrating a method of operation of the distributed voice browser of FIG. 1.

FIG. 2 is a flow chart illustrating a method 200 of implementing a telephony service feature as performed by the system of FIG. 1. The method 200 can begin in a state wherein the system of FIG. 1 has instantiated at least one service processor for each channel processor of the media gateway. Additionally, one or more parsers, such as VXML parsers, can be instantiated such that the service processors and the parsers have registered with the session managers. Notably, there need not be a one to one correspondence between the service processors and the parsers. In any event, a telephony switch can receive a call. The telephony switch can select a free channel processor of the media gateway and query the media gateway to accept the call, for example using inband signaling or ISDN D-channel. Responsive to the media gateway accepting the call, the telephony switch can apply the call to the chosen channel processor. Accordingly, in step 205, the call can be identified by the media gateway. In step 210, the called directory number of the received call can be determined.

In step 215, one or more call processing scripts that are associated with the determined directory number can be identified. For example, the listing of called directory numbers and associated VXML scripts can be consulted to determine the particular call processing scripts, or VXML script representations of telephony services, for which the directory number has been registered. In step 220, the media gateway can send at least the following information to the session manager via a TCP/IP connection: the called directory number, one or more URIs specifying call processing script representations of telephony services for which the directory number has been registered, and an identifier representing the particular channel processor upon which the call was received.

Prior to transmitting the URI to an available parser, as shown in step 225, the session manager can query the cache memory via a TCP/IP connection to determine whether the call processing script specified by the URI is contained within the cache memory. If so, the call processing script has already been parsed by the parser and exists in an intermediate format which maps to the service processors. Accordingly, the parsed call processing script can be retrieved from the cache memory in step 230 and the method can continue to step 250. If, however, the cache memory does not include the call processing script specified by the URI, the method can continue to step 235.

In step 235, the session manager can identify an available parser and provide the URI to the parser through a TCP/IP connection. Notably, the session manager can save a local copy of the channel processor identifier. In step 240, the parser can issue an HTTP request to an HTTP server to retrieve the call processing script specified by the URI. The call processing script can include, for example, voice markup language scripts such as VXML documents, text, scripts, as well as selected portions of audio. In step 245, the parser can receive the requested call processing script via an HTTP connection. The parser then can parse the call processing script, converting the call processing script into an intermediate format which can be interpreted by the service processors.

In step 250, the parsed call processing script can be transmitted from the parser to the session manager via a TCP/IP connection. The session manager, in step 255, having retained the channel processor identifier, can identify a service processor (script/bean) associated with the channel processor that received the call. In step 260, the session manager can transmit the parsed call processing script to the identified service processor. Accordingly, the service processor can implement the telephony service by executing the parsed call processing script. In step 265, the service processors can access any required functionality, such as the voice processor of the media gateway, via the bean/script interface to implement the telephony service.

The invention disclosed herein provides a solution for increasing the scalability and performance of voice browsers by partitioning the voice browser into several components. For example, the voice browser can be partitioned into separate components for handling parsing, session management, and service fulfillment, each of which can be located and execute on separate computing machines. Additionally, as the various components of this voice browser architecture can be replicated as needed, the present invention can support an increased call volume as well as provide a scalable voice browser solution.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

The invention claimed is:

1. A computer-readable storage device encoded with computer-readable instructions that, when executed by a computing device, perform a method of call processing using a distributed voice browser, comprising:
    partitioning a voice browser into separate components, including a parser, a service processor and a session manager, the components of the voice browser located and executing on separate computing machines, wherein the components of the voice browser, located on separate computing machines, are replicated as needed to support increased call volume;
    providing a media gateway having a plurality of channel processors;
    instantiating a plurality of Voice Extensible Markup Language (VXML) parsers, each of the VXML parsers being configured to retrieve and parse VXML script representing a telephone service, and wherein the VXML parsers are instantiated in a first computing machine;
    instantiating a plurality of service processors, each of the service processors being configured to interpret VXML data parsed by the VXML parsers, and wherein the service processors are instantiated in a second computing machine;
    instantiating a plurality of session managers, wherein the session managers are instantiated in a third computing machine;
    receiving a call by telephone switch, wherein the telephone switch selects a free channel processor of the media gateway, queries the media gateway to accept the call, and applies the call to the selected channel processor;
    identifying call processing VXML scripts associated with the received call;
    identifying a service processor and transmitting the identified VXML scripts to the identified service processor;
    implementing the telephone service by the service processor by executing the identified VXML scripts;
    determining a change in call volume during run time; and
    varying, at run time to support increased call volume, a number of service processors, a number of VXML parsers, and a number of session managers independently in response to determining a change in call volume detected during run time.

2. The computer-readable storage device of claim 1, wherein the method of call processing further comprises:
    receiving a telephony service request, wherein said telephone service request is associated with a particular one of said service processors and specifies a location of said VXML data representing said telephony service.

3. The computer-readable storage device of claim 2, wherein the method of call processing further comprises:
    determining an available VXML parser; and
    providing said specified location to said available VXML parser.

4. The computer-readable storage device of claim 3, wherein the method of call processing further comprises:
    retrieving said VXML data from said specified location; and
    parsing said VXML data to convert said VXML data to an intermediate format.

5. The computer-readable storage device of claim 4, wherein the method of call processing further comprises:
    receiving said parsed VXML data; and
    providing said parsed VXML data to said associated service processor.

6. The computer-readable storage device of claim 5, wherein the method of call processing further comprises:
    executing said parsed VXML data to implement said telephony service.

7. A system for call processing using a distributed voice browser, the system comprising:
    a computing device and a memory encoded with instructions that, when executed by the computing device, are configured to:
    partition a voice browser into separate components, including a parser, a service processor and a session manager, the components of the voice browser located and executing on separate computing machines, wherein the components of the voice browser, located on separate computing machines, are replicated as needed to support increased call volume;
    instantiate a plurality of Voice Extensible Markup Language (VXML) parsers, each of the VXML parsers being configured to retrieve and parse VXML script representing a telephone service, and wherein the VXML parsers are instantiated in a first computing machine;
    instantiate a plurality of service processors, each of the service processors being configured to interpret VXML data parsed by the VXML parsers, and wherein the service processors are instantiated in a second computing machine;
    instantiate a plurality of session managers, wherein the session managers are instantiated in a third computing machine;
    receive a call by telephone switch, wherein the telephone switch selects a free channel processor of a media gateway having a plurality of channel processors, queries the media gateway to accept the call, and applies the call to the selected channel processor;
    identify call processing VXML scripts associated with the received call;

identify a service processor and transmitting the identified VXML scripts to the identified service processor;

implement the telephone service by the service processor by executing the identified VXML scripts;

determine a change in call volume during run time; and vary, at run time to support increased call volume, a number of service processors, a number of VXML parsers, and a number of session managers independently in response to determining a change in call volume detected during run time.

8. The system of claim 7, wherein the instructions are further configured to:

receive a telephony service request, wherein said telephone service request is associated with a particular one of said service processors and specifies a location of said VXML data representing said telephony service.

9. The system of claim 8, wherein the instructions are further configured to:

determine an available VXML parser; and provide said specified location to said available VXML parser.

10. The system of claim 9, wherein the instructions are further configured to:

retrieve said VXML data from said specified location; and parse said VXML data to convert said VXML data to an intermediate format.

11. The system of claim 10, wherein the instructions are further configured to:

receive said parsed VXML data; and provide said parsed VXML data to said associated service processor.

12. The system of claim 11, wherein the instructions are further configured to:

execute said parsed VXML data to implement said telephony service.

13. The system of claim 7, wherein said VXML parsers are configured to execute within at least one virtual machine.

14. The system of claim 13, wherein said service processors are configured to execute within at least one virtual machine which is independent of said at least one virtual machine for said VXML parsers.

15. A method of call processing using a distributed voice browser, the method comprising:

partitioning a voice browser into separate components, including a parser, a service processor and a session manager, the components of the voice browser located and executing on separate computing machines, wherein the components of the voice browser, located on separate computing machines, are replicated as needed to support increased call volume;

receiving a call by telephone switch, wherein the telephone switch selects a free channel processor of a media gateway having a plurality of channel processors, queries the media gateway to accept the call, and applies the call to the selected channel processor;

identifying call processing VXML scripts associated with the received call;

identifying a service processor and transmitting the identified VXML scripts to the identified service processor;

implementing the telephone service by the service processor by executing the identified VXML scripts;

determining a change in call volume during run time; and varying, at run time to support increased call volume, a number of service processors, a number of VXML parsers, and a number of session managers independently in response to determining a change in call volume detected during run time.

16. A computer-readable storage device encoded with computer-readable instructions that, when executed by a computing device, perform a method of call processing using a distributed voice browser, comprising:

partitioning a voice browser into separate components, including a parser, a service processor and a session manager, the components of the voice browser located and executing on separate computing machines, wherein the components of the voice browser, located on separate computing machines, are replicated as needed to support increased call volume;

receiving a call by telephone switch, wherein the telephone switch selects a free channel processor of a media gateway having a plurality of channel processors, queries the media gateway to accept the call, and applies the call to the selected channel processor;

identifying call processing VXML scripts associated with the received call;

identifying a service processor and transmitting the identified VXML scripts to the identified service processor;

implementing the telephone service by the service processor by executing the identified VXML scripts;

determining a change in call volume during run time; and varying, at run time to support increased call volume, a number of service processors, a number of VXML parsers, and a number of session managers independently in response to determining a change in call volume detected during run time.

17. A system for call processing using a distributed voice browser, the system comprising:

a computing device and a memory encoded with instructions that, when executed by the computing device, are configured to:

partition a voice browser into separate components, including a parser, a service processor and a session manager, the components of the voice browser located and executing on separate computing machines, wherein the components of the voice browser, located on separate computing machines, are replicated as needed to support increased call volume;

receive a call by telephone switch, wherein the telephone switch selects a free channel processor of a media gateway having a plurality of channel processors, queries the media gateway to accept the call, and applies the call to the selected channel processor;

identify call processing VXML scripts associated with the received call;

identify a service processor and transmitting the identified VXML scripts to the identified service processor;

implement the telephone service by the service processor by executing the identified VXML scripts;

determine a change in call volume during run time; and vary, at run time to support increased call volume, a number of service processors, a number of VXML parsers, and a number of session managers independently in response to determining a change in call volume detected during run time.

* * * * *